(12) United States Patent
Monget et al.

(10) Patent No.: US 6,431,490 B1
(45) Date of Patent: Aug. 13, 2002

(54) PROCESS FOR DEPOSITING BY WINDING ON A SUPPORT SEVERAL ROVINGS SIMULTANEOUSLY OF PRE-IMPREGNATED FIBERS, DEVICE FOR PRACTICING THE SAME, AND STRUCTURE OF A COMPOSITE MATERIAL THUS OBTAINED

(75) Inventors: François Monget, Merignac; Patrick Decraecker, Arsac, both of (FR)

(73) Assignee: Societe Nationale Industrielle et Aerospatiale, Paris (FR)

( * ) Notice: Subject to any disclaimer, the term of this patent is extended or adjusted under 35 U.S.C. 154(b) by 0 days.

(21) Appl. No.: 09/235,764

(22) Filed: Jan. 25, 1999

(30) Foreign Application Priority Data

Jan. 23, 1998 (FR) .............................. 98 00936

(51) Int. Cl.[7] .............................. B21C 47/02
(52) U.S. Cl. ................. 242/444; 242/443.1; 242/530.2; 242/536
(58) Field of Search .............................. 242/444, 443.1, 242/443, 471, 478, 478.1, 528, 530, 530.1, 530.2, 536; 156/229, 184, 185, 188, 190

(56) References Cited

U.S. PATENT DOCUMENTS

| 4,322,041 A | * | 3/1982 | Schuller et al. |
| 4,600,619 A | | 7/1986 | Chee et al. |
| 4,927,129 A | * | 5/1990 | Merkli |
| 5,639,175 A | | 6/1997 | Emoto |

FOREIGN PATENT DOCUMENTS

| EP | 0 493 046 | 7/1992 |
| EP | 0 724 946 | 8/1996 |

* cited by examiner

Primary Examiner—Deborah Jones
Assistant Examiner—Wendy Boss
(74) Attorney, Agent, or Firm—Young & Thompson

(57) ABSTRACT

A process and apparatus for depositing simultaneously by winding on a support, several rovings of pre-impregnated fibers. The rovings are deposited simultaneously by winding on a rotating support. At least two rovings are brought into superposition near where they will be applied to the support, and the various rovings are subjected to different tensions depending on their position relative to the support. Specifically, the roving nearest the support is subjected to a greater tension than a roving farther from the support. Composite structures are thus produced.

19 Claims, 3 Drawing Sheets

PROCESS FOR DEPOSITING BY WINDING ON A SUPPORT SEVERAL ROVINGS SIMULTANEOUSLY OF PRE-IMPREGNATED FIBERS, DEVICE FOR PRACTICING THE SAME, AND STRUCTURE OF A COMPOSITE MATERIAL THUS OBTAINED

This application corresponds to French application 98 00936 of Jan. 23, 1998, the disclosure of which is incorporated herein by reference.

FIELD OF THE INVENTION

The present invention relates to the simultaneous deposition by winding on a support, of several rovings of pre-impregnated fibers.

BACKGROUND OF THE INVENTION

One of the objects of the invention is to provide, by winding of rovings of fibers pre-impregnated with a resin and/or a suitable glue, an active skin of a panel of composite material with acoustic attenuation.

Generally speaking, such a panel is constituted of a sandwich comprising a central core of honeycomb structure covered on one side with a passive skin, impermeable to sound, and, on the other side, with an active skin, permeable to sound and hence provided with a suitable porosity.

Such an active skin can be made in several ways.

It can be constituted of one or several metallic sheets perforated regularly with calibrated holes.

It can also be constituted by a self-rigid metallic cloth, commonly called wire roving, reinforced for example with a cloth of carbon fibers of large roving to increase the structural strength of the exposed surface of the panel.

Controlling porosity, that is to say the amount of obduration, of the compound metallic cloth-carbon cloth is very difficult. If the proper porosity of each constituent is known and controlled, the final porosity of the assembly is often far from the desired theoretical porosity. The central reason for this phenomenon is the closing of certain of the interstices between the threads or filaments of said constituents by flow of the glue binding the constituents together as well as of the metallic cloth to the honeycomb structure.

In French patent application No. 97 09102, filed in the name of the assignee, there is proposed an acoustic attenuation panel whose active skin is made by winding rovings of pre-impregnated fibers, so as to obtain a skin constituted solely by fibers embedded in a resin matrix.

The winding of this active skin nevertheless requires a certain precision so as to give to the skin the desired permeability to sound between two successive windings with a suitable spacing.

However, this technique is limited to the production of a relatively thin skin, because the greater the thickness of the skin, not only is the porosity reduced but becomes uncertain, because the control of the precise positioning of the wound rovings is extremely difficult.

The use of this technique, shown for example by French patent application No. 97 10490, filed in the name of the assignee, for the production of a structural reinforcement on one of the surfaces of the metallic cloth instead of said carbon cloth with large rovings, does not permit solving satisfactorily the problem of precision of porosity, most particularly if it is desired to give to this structural reinforcement a substantial thickness greater than that of a single layer of wound rovings.

Another object of the invention is to provide a means to reduce the winding time of the rovings of pre-impregnated fibers on any support, which can be for example the winding mandrel itself, or an element connected to this mandrel, such as honeycomb structure, a metallic cloth or sheet perforated or not.

SUMMARY OF THE INVENTION

To these ends, the invention has for its object a process for depositing simultaneously by winding on a support, several rovings of pre-impregnated fibers, characterized in that it consists in superposing at least two rovings at the deposition place on the support, driven in rotation, said rovings being tensioned with different values in proportion to the range of superposition of the rovings, the roving nearest the support being more highly tensioned.

According to a first application, the winding is carried out so as to obtain a helicoidal winding with touching turns, in at least one layer.

According to a second application more specifically adapted to the production of an active skin permeable to sound, the winding is carried out so as to obtain a helicoidal winding with spires that do not touch, in at least one layer.

Spacing between two adjacent turns is constant along a generatrix of the rotatable support or variable locally along said generatrix.

The angle of inclination of the rovings to the axis of the rotatable support, generally constant from one end to the other of said support, is comprised between substantially 90°, the windings being of the circumferential type, and several degrees, the windings being of the longitudinal type.

The number of superposed rovings can be as desired and can exceed about ten and the physical characteristics or even the nature itself, of each roving can vary. Thus the section, the density of filaments, the width can vary from one roving to the other according to the objectives to be achieved.

The support on which are wound the rovings can be a metallic cloth, the complex thus obtained, after polymerization, being adapted to constitute an active skin of a panel of composite material for the attenuation of sound.

The support can also be a honeycomb structure, preliminary emplaced on a mandrel, the windings thus wound constituting the active skin of an acoustic attenuation panel.

According to a modification of the procedure used to produce an active skin, there are wound simultaneously several groups of superposed rovings, said groups being disposed side by side and separated by a separating filament or ribbon adapted to be withdrawn after polymerization of the resin of the fibers and/or of the glue.

This permits obtaining a very precise spacing between two adjacent turns of the helicoidal winding.

In the case of winding with touching turns, the winding support can be, as the case may be, either mandrel for direct winding followed by the emplacement of other elements such as a honeycomb structure, a cloth, a metallic sheet, etc. . . . , or one or several elements first emplaced on a mandrel, such as a skin or a honeycomb structure, or again a structure serving as a rotatable mandrel, such as a metallic envelope for the production of receptacles for storage of fluid under high pressure.

Pre-impregnation with the help of the resin and/or suitable glue, of the fibers of the rovings, is carried out upon production of the rovings or else in situ by passing the rovings through a suitable bath just before depositing them on the rotatable support.

The invention also has for its object a device for practicing the process, characterized in that the specific means to emplace and superposition the rovings, giving them the suitable tension, guiding them laterally if desired just before their deposition on the rotatable support, or again of the means to apply and position the groups of superposed rovings with a separator in the modification mentioned above.

The invention finally has for its object any structure or a part of a structure including a skin or cladding constituted of rovings deposited according to the process.

BRIEF DESCRIPTION OF THE DRAWING

Other characteristics and advantages of the invention will become apparent from the description which follows, of embodiments for practicing the process, which description is given by way of example alone and with respect to the accompanying drawings, in which.

DETAILED DESCRIPTION OF THE INVENTION

Figure 1:
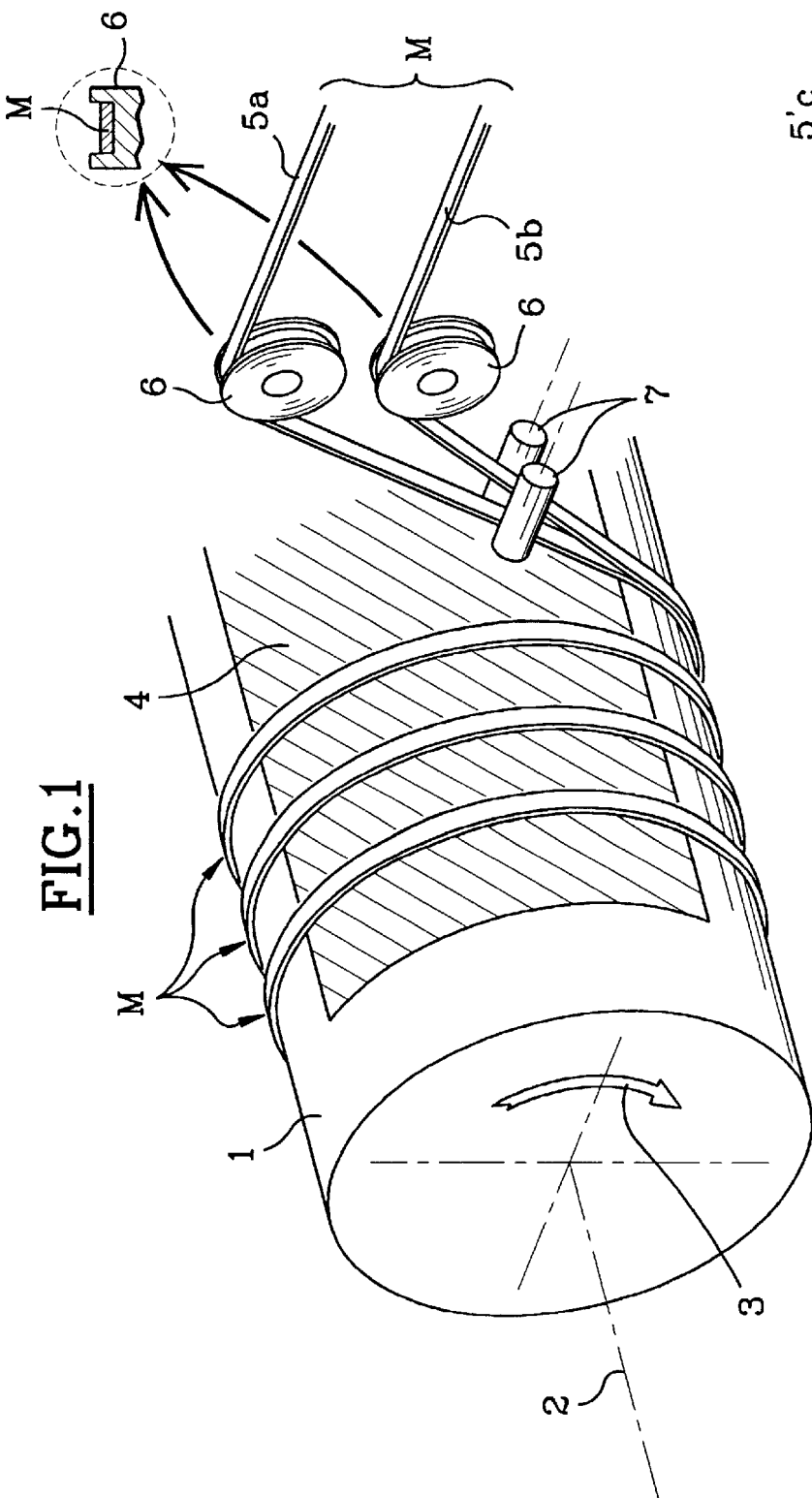
FIG. 1 is a fragmentary perspective view of a device for practicing the process of the invention.

In FIG. 1, there is shown schematically at numeral 1 a cylindrical mandrel with an axis 2, driven in rotation in the direction of the arrow 3 by conventional suitable means (not shown).

The figure shows the reinforcement of a metallic cloth shown at 4, with the aid of fiber rovings M, for example of carbon, pre-impregnated, so as to produce an active skin adapted for example for a panel of composite acoustical attenuation material, such skin being constituted of metallic cloth 4 reinforced on one of its surfaces with parallel rovings at a constant predetermined distance from each other, the assembly being made of one piece by polymerization of the resin impregnating fibers.

To this end, the metallic cloth 4 is placed and fixed against the mandrel 1 by any suitable means.

The rovings M, according to the invention, are wound in superposition about the mandrel 1, with a predetermined constant spacing between two adjacent turns as shown in FIG. 1.

The rovings M, two in number, respectively 5a and 5b, in the figure, come from two bobbins (not shown) and are disposed, adjacent the mandrel 1, in superposition with the help of two idler pulleys 6, with axes parallel to the axis 2.

Preferably, the pulleys 6 are flat bottom recess pulleys and calibrated as a function of the width of the rovings for precise superposition without lateral wandering of one roving relative to the other.

If desired, and as a supplement, two parallel lateral guide rollers 7 are provided, disposed between the pulleys 6 and the region of the deposit of the rovings on the mandrel, the two rovings 5a, 5b running between these two rollers, separating by a distance equal to the width of the rovings.

Moreover, according to the invention, the two rovings 5a, 5b are subjected, in the course of winding, to different tensions, the tension of the roving in the first row from the mandrel, which is to say the roving 5a, being greater than that of the roving 5b in row 2, the outside roving.

For example, the rovings are constituted of 12,000 filaments or fibrils and have a rectangular cross-section of 0.35 mm thickness and 3.38 mm width. The winding tension of the roving in row 1, the interior roving 5a, is of the order of 4 to 6 daN, whilst the tension in the other roving 5b is of the order of 2 to 3 daN.

Generally, and preferably, the tension of the outer roving 5b is comprised between half and about two-thirds of that of the underlying or internal roving 5a.

The number of superposed rovings can of course be greater than two and can exceed about ten, for example. Generally speaking, there will be applied to the rovings thus superposed, a winding tension which will decrease from the roving of row 1 (nearest the mandrel once in place) to the outermost roving (next outside roving or farthest from the mandrel).

The rovings M are formed of high resistance carbon fibers or any other natural or synthetic fiber (glass, Kevlar, aramide, etc. ...) usually used in the production of members or structures of composite material. The number of filaments or fibrils per roving can vary, for example 6,000, 12,000 or 24,000, as well as the cross-section (width, thickness).

Figure 3:
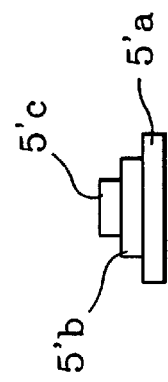
FIG. 3 is a cross-sectional view of an assembly of three rovings.

The superposed rovings generally have a same width, but according to the application, they could have different widths, for example and as shown in FIG. 3, a width decreasing from the innermost roving $5'a$ to the third row roving $5'c$, the intermediate roving $5'b$ having an intermediate width.

According to a modified embodiment, the superposed rovings can be constituted of one or several rovings of rectangular section on which is disposed a roving in the form of a round filament, in particular a covered filament, which is to say enveloped by a wound filament of the same nature. Thus, such a round filament, which has a thickness substantially greater than that of the flat rovings, increases the mechanical inertia of the skin constituted by such a winding.

The inclination in the course of winding of the rovings relative to the axis 2 of the mandrel, can be variable from one metallic cloth 4 to the other, according to the application.

This inclination can cover all the range of possible inclinations in the field of winding, which is to say between practically 90°(winding of the circumferential type) and several degrees (winding of the longitudinal type).

In FIG. 1, the winding is of the circumferential type.

The deposited rovings are, according to the placement of the metallic cloth 4 on the mandrel, parallel to the warp or weft filaments of the metallic cloth 4, or on the contrary form an angle, for example 45°, relative to these warp and weft filaments.

It is to be noted that in a same metallic cloth 4, the rovings can be wound according to several inclinations, for example two inclinations at ±45° relative to the axis of the mandrel, or three inclinations, respectively ±45° and 90°. Under these circumstances, the rovings are thus wound according to two or three layers, one layer being defined as the assembly of rovings having the same inclination or direction, no matter what the thickness of the wound assembly.

Figure 2:
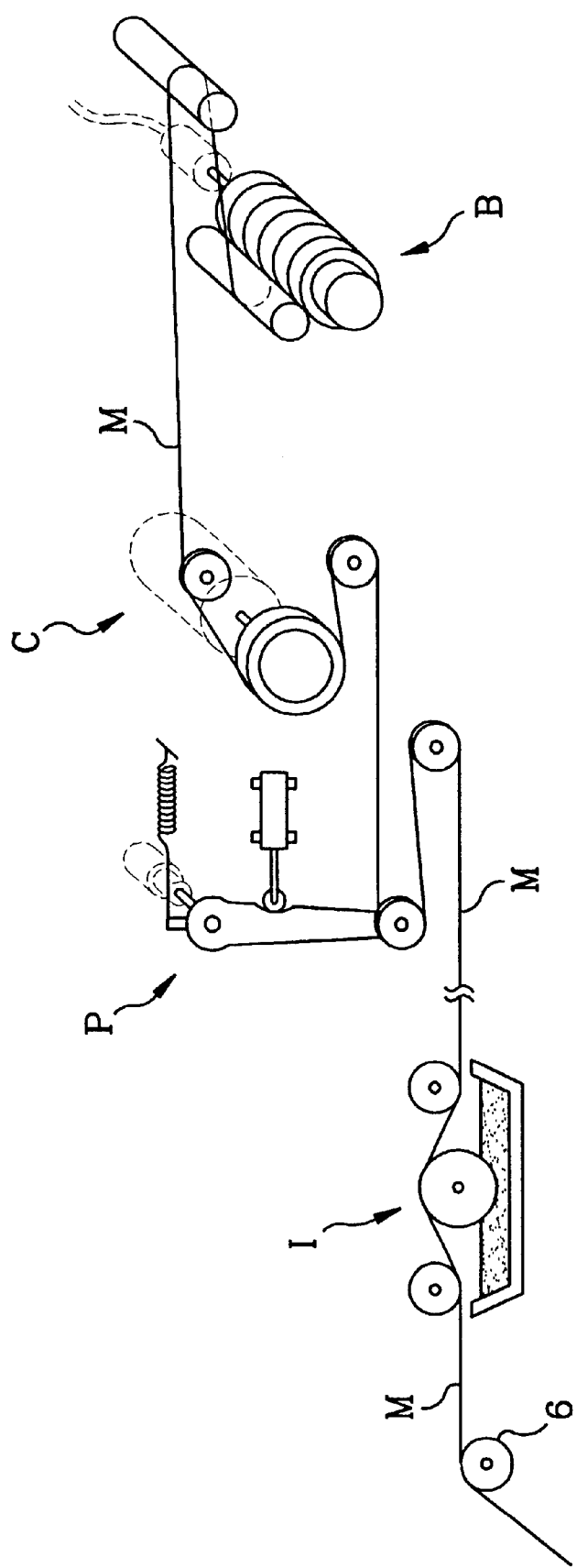
FIG. 2 is a schematic view of the paths of deposition of a roving from a bobbin.

FIG. 2 shows the path of a roving M from a storage bobbin B to a pulley 6. The bobbin B is, for example, and in known manner, mounted on a drum driven by a pneumatic motor. The roving M cut by a cutter C, then passes through a take-up device P, that is directed toward the pulley 6.

The rovings on the bobbins B are either pre-impregnated with a resin, for example thermosetting, or with a suitable glue, or are non-impregnated, in which case they are subjected to pre-impregnation of the so-called in situ or "wetting" type, immediately upstream of the pulley 6, for example the passage through an impregnation station on a roller, generally indicated at I, with the aid of a suitable resin, or an equally suitable glue.

In the case of an impregnation with resin plus glue, the rovings are first impregnated with a suitable resin, then impregnated with a suitable glue, for example a glue known by the commercial name Loctite or known as Isol, for reinforcement of the gluing particularly of the carbon on the metal.

By adjustment of the spacing between two adjacent pairs of rovings on the metallic cloth 4, which is to say of the interval of helicoidal winding, there can be given a predetermined precise porosity to the assembly constituted by the metallic cloth 4 and the reinforcing rovings.

This assembly is polymerized in a known manner, and then withdrawn from the mandrel.

Its flexibility permits it to be applied and glued on a concave or convex surface of a honeycomb structure to form an active skin of a panel of composite material.

The process of the invention particularly permits producing active internal skins of sound attenuation panels of sands having properties both of acoustical attenuation and of structural strength which will be altogether satisfactory.

Moreover, neither the weight nor the thickness of the active skin is very substantially increased by winding of superposed rovings, giving the substantial improvement in mechanical and acoustical performances.

The process of the invention can be practiced for other purposes than the production of an active skin of controlled porosity.

Thus the winding of superposed rovings, no matter what the number, can be carried out with touching turns, which, relative to a winding of conventional touching turns with a single roving or plural rovings side by side, permits obtaining a thickness of wound coating in a much shorter time.

In this application, the conditions of tension of the superposed rovings are similar to those set forth above in connection with FIG. 1, for the same reason: avoiding too great compression of the subjacent deposited roving or rovings.

The superposed rovings can be, according to the intended use, wound directly on a mandrel which is either a standard winding tool, or produced especially and preferably preliminarily clad with a demolding agent, namely a structure which must be covered with a filamentary winding, such as a metallic envelope of a storage receptacle for fluid under high pressure, or a reservoir ring of large size.

In the case of a mandrel constituted by a winding tool, this latter can be of various types, for example metallic, of plastic material of the foam type, of foundry sand for example of "arenyl", or again of composite material, less costly than metal.

The superposed rovings can also be wound on one or several elements of a structure or piece of composite material, already in place on a mandrel, for example a first skin produced by winding or draping, covered with a honeycomb core, such as to obtain a panel whose external skin will be constituted by the winding of said superposed rovings.

In these applications, the mandrel can be withdrawable or fusible, if necessary, to withdraw the assembly emplaced on the mandrel.

Figure 4:
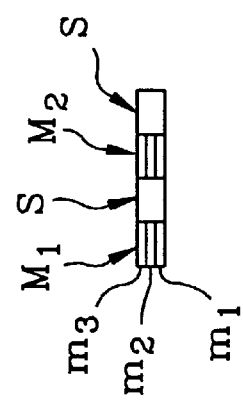
FIG. 4 is a cross-sectional view of a group of several assemblies of superposed rovings, separated by a separating filament or ribbon.
Figure 5:
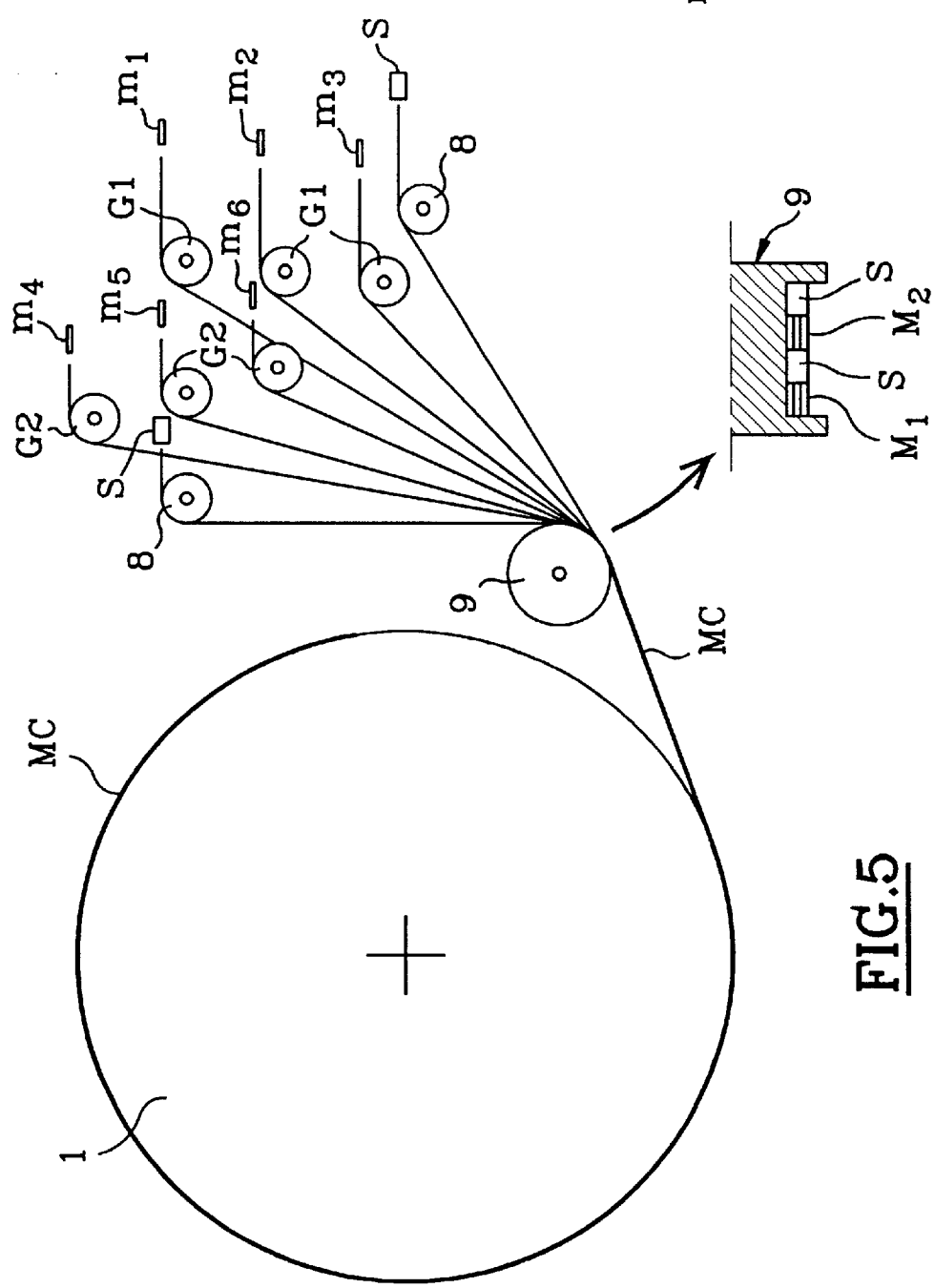
FIG. 5 is a schematic view showing the placement of the rovings and separators of FIG. 4.

According to a modification, shown in FIGS. 4 and 5, for winding non-touching turns so as to produce a skin with a predetermined degree of porosity, constituted by a layer of superposed rovings wound directly on a mandrel 1 or on a metallic element permeable to sound fixed on the mandrel (thin perforated sheet metal, metallic cloth or the like), there can be wound simultaneously several groups (two in FIGS. 4 and 5) of superposed rovings.

FIG. 4 is a cross-section of an assembly forming thus a complex wound roving as would be involved in a single roving and constituted by four portions disposed side by side, namely two groups M1, M2 of three superposed rovings and two separating elements S constituted by a filament or a ribbon.

The four portions $M_1$, $M_2$, S are disposed in alternation so as to position on the mandrel 1, side by side, the assembly of FIG. 4 produced by a helicoidal roving with constant pitch, whose value corresponds to the width of the separating filament or ribbon S.

The roving of the groups $M_1$, $M_2$ are generally identical and the thickness of the filament or ribbon S corresponds to at least the thickness of said groups.

The separation S is adapted essentially to give to the wound turns on the mandrel 1 a constant and very precise spacing and must be withdrawn, once polymerization of the impregnating resin of the fibers of the rovings has been carried out, and if desired of the adhesive resin for securing the winding thus produced on the structure or the subjacent support or the securement of portions of this structure.

To this end, the separator S is non-adhesive and for example is constituted by glass fiber impregnated with Teflon.

FIG. 5 shows an example of means for emplacing on the mandrel 1 the complex roving of FIG. 4.

The rovings $m_1$, $m_2$, $m_3$ and $m_4$, $m_5$, $m_6$, respectively, of each group $M_1$, $M_2$, are assembled in the same way as in FIG. 1 with the help of two respective groups G1 and G2 of pulleys of calibrated throat.

The pulleys of group G1 are in the same vertical plane and those of group 2 are in the vertical plane laterally offset relative to the other.

The two separators S are in the same manner supplied from two pulleys 8 suitably positioned relative to the pulleys $G_1$, $G_2$.

The assembly of the elements $m_1$ to $m_6$ and S is assembled on an idler pulley 9 with a calibrated throat, interposed between the set of pulleys G1, G2, 8 and the mandrel 1.

The compound roving MC thus formed is wound with touching turns.

After polymerization, the separator S is withdrawn from the mandrel by simple unwinding.

The number of rovings of a group $G_1$ or $G_2$ can be variable, from two to more than about ten for example. Similarly, the number of groups of rovings can be greater than two.

The compound roving MC can be wound on a metallic cloth 4 of the type of FIG. 1, covering a portion or even all of the mandrel 1.

Generally speaking, the layer or layers wound with non-touching turns of superposed rovings, as well as the layers wound with touching turns of these same superposed rovings, are either applied to one of the surfaces or both surfaces, of a structural element, simple (metallic cloth for example) or compound (first skin and perforate core of a composite panel to be formed for example), or interposed between two structures, themselves simple or compound, or again directly on a winding mandrel preliminarily covered with a demolding agent.

Said simple structural element could be, as indicated above, a metallic cloth, but also, generally speaking, any other reinforcing element, such as a metal sheet, a plastic film, for example a film of mylar or a cloth of textile nature of the type of canvas, netting, tarpaulin, for uses in other fields than aeronautics, for example pleasure craft, sailboats, etc....

It is also to be noted that on a same support, for example of metallic cloth, a perforated metallic sheet or metallic cloth, the superposed rovings can be wound in nontouching turns with an interval that can vary locally, for example along one generatrix of the metallic cloth or the like in the course of winding, to give to the obtained skin locally variable properties of acoustic attenuation thanks to a different amount of porosity suitable for condition of use of the final panel incorporating such an active skin.

The technique of the invention can also for example be preferably used for the production of panel or pieces of the type described in French patent applications of the assignee, Nos. 97 09102, 97 09103 and 97 10490.

What is claimed is:

1. A process for depositing simultaneously by winding on a support several rovings of pre-impregnated fibers, comprising the steps of:
    superposing at least two rovings at the position of deposition on the support;
    driving the support in rotation while winding the superposed rovings on the support; and
    appplying to the rovings different tensions with the roving nearer the support being under a first tension and the roving farther from the support being under a second tension less than the first tension.

2. A process as claimed in claim 1, wherein the winding tension of one roving is comprised between about half and two-thirds of that of an immediately underlying roving.

3. A process as claimed in claim 1, wherein the rovings are of different widths, the greater width being nearer the support.

4. A process as claimed in claim 3, wherein the rovings are of rectangular cross-section.

5. A process as claimed in claim 1, wherein the rovings are fibers selected from the group consisting of carbon, glass, and aramide.

6. A process as claimed in claim 1, wherein the rovings consist of fibers of a number selected from the group consisting of 6,000, 12,000 and 24,000.

7. A process as claimed in claim 1, wherein the rovings are wound in touching turns in at least one layer.

8. A process as claimed in claim 1, wherein the rovings are wound in spaced turns in at least one layer.

9. A process as claimed in claim 8, wherein several groups of superposed rovings are separated by separator elements and are wound simultaneously, and wherein said separator elements are thereafter removed.

10. A process as claimed in claim 9, wherein the separator elements are constituted by non-adhesive filaments or strips.

11. A process as claimed in claim 10, wherein said filaments or strips are of glass fiber impregnated with polytetrafluoroethylene.

12. A process as claimed in claim 1, wherein the fibers of the rovings are pre-impregnated with at least one of a resin and glue.

13. A process as claimed in claim 1, wherein the fibers of the rovings are pre-impregnated in situ immediately before their winding.

14. A process as claimed in claim 1, wherein the rovings are wound on a reinforcing element mounted on a mandrel, said reinforcing element being selected from the group consisting of metallic elements, plastic films, and textile elements.

15. A process as claimed in claim 14, wherein said metallic element is selected from the group consisting of thin sheets, cloths, and self-rigid metallic cloths.

16. A process as claimed in claim 1, wherein the winding is effected at an angle between 90° and several degrees relative to an axis of rotation of said support.

17. A process as claimed in claim 1, wherein the support is a winding mandrel which is thereafter removed from within the wound rovings.

18. A process as claimed in claim 1, wherein the support is a mandrel on which is mounted a covering element.

19. A process as claimed in claim 1, wherein the support is a metallic envelope.

* * * * *